(12) United States Patent
Dai

(10) Patent No.: US 9,602,213 B2
(45) Date of Patent: Mar. 21, 2017

(54) SYSTEM AND METHOD OF EXTENDING TIME DIVISION PASSIVE OPTICAL NETWORK SERVICES TO PLASTIC OPTICAL FIBER IN THE HOME

(71) Applicant: COX COMMUNICATIONS, INC., Atlanta, GA (US)

(72) Inventor: Yuxin Dai, Santa Rosa, CA (US)

(73) Assignee: Cox Communications, Inc., Atlanta, GA (US)

(*) Notice: Subject to any disclaimer, the term of this patent is extended or adjusted under 35 U.S.C. 154(b) by 43 days.

(21) Appl. No.: 14/661,461

(22) Filed: Mar. 18, 2015

(65) Prior Publication Data
US 2016/0277112 A1 Sep. 22, 2016

(51) Int. Cl.
H04J 14/00 (2006.01)
H04B 10/00 (2013.01)
H04L 12/66 (2006.01)
H04B 10/27 (2013.01)

(52) U.S. Cl.
CPC .................................. H04B 10/27 (2013.01)

(58) Field of Classification Search
CPC . H04B 10/27; H04B 10/2575; H04B 10/2581
USPC ............................................. 398/51, 58, 66
See application file for complete search history.

(56) References Cited

U.S. PATENT DOCUMENTS

| | | | | |
|---|---|---|---|---|
| 5,600,469 A * | 2/1997 | Yamazaki | .......... | H04Q 11/0001 370/395.5 |
| 2003/0072061 A1* | 4/2003 | Ishii | .................. | H04B 10/2581 398/141 |
| 2004/0133920 A1* | 7/2004 | Kim | ................... | H04N 7/17318 725/129 |
| 2005/0169632 A1* | 8/2005 | Song | ...................... | H04H 20/77 398/72 |
| 2005/0207398 A1* | 9/2005 | Choi | .................. | H04L 12/6418 370/352 |
| 2008/0118204 A1* | 5/2008 | Ankerhold | .......... | G02B 6/3604 385/51 |
| 2008/0178228 A1* | 7/2008 | Park | ........................ | H04N 7/10 725/78 |
| 2012/0027416 A1* | 2/2012 | Rollins | ................ | H04B 10/272 398/116 |

(Continued)

OTHER PUBLICATIONS

Nakamura ["Long Cable PHY for IEEE1394", WAM P1.3, IEEE 1998].*

*Primary Examiner* — Oommen Jacob
(74) *Attorney, Agent, or Firm* — Benjamin A. Balser; Next ip Law Group LLC

(57) ABSTRACT

A system (87; FIG. 2) is disclosed to provide a Time Division Multiple Access Passive Optical Network to a Plastic Optical Fiber to be used in both single-family home networks and in multiple dwelling units. The system (87) extends the fiber to the home fiber network infrastructure from existing fiber access networks to fiber in the home for home networking. A plastic optical fiber converter (48; FIG. 4) associated with an optical network terminal (56; FIG. 6) receives a downstream optical signal (15; FIG. 3) that is converted into an electrical signal (61; FIG. 6). The converter (48) within the optical network terminal (56) modulates Ethernet frames contained within the electrical signal and converts the frames into optical signals (71,72; FIG. 6) with advanced modulations that are then transmitted via the plastic optical fiber within the home network (124; FIG. 2).

16 Claims, 11 Drawing Sheets

(56) References Cited

U.S. PATENT DOCUMENTS

2012/0121265 A1\* 5/2012 Suvakovic ........... H04B 10/272
   398/66
2014/0255032 A1\* 9/2014 Gottwald ........... H04B 10/2575
   398/68

\* cited by examiner

SYSTEM AND METHOD OF EXTENDING TIME DIVISION PASSIVE OPTICAL NETWORK SERVICES TO PLASTIC OPTICAL FIBER IN THE HOME

TECHNICAL FIELD

The present disclosure relates generally to a passive fiber optical network and more specifically to the extension of a Time Division Multiple Access passive fiber optical network to a plastic optical fiber within a single-family home network.

DESCRIPTION OF RELATED TECHNOLOGY

A passive optical network (PON) is a fiber-to-the-home (FTTH) architecture that includes a point-to-multipoint (P2MP) optical distribution network (ODN) in which passive optical splitters are used to enable a single optical fiber to serve multiple homes. A PON may include an optical line terminal (OLT) at the service provider's central office and a number of optical network terminals (ONTs) or optical network units (ONUs) at the customer premises. A Time Division Multiple-access (TDMA) PON is a technology in which the ONTs are assigned different time slots for their upstream transmission to avoid the collision of optical signals.

FIG. 1 illustrates the prior art architecture of a TDMA PON 120. In TDMA PON 120, downstream data packets 105 originate at central office 103, which includes optical line terminal (OLT) 104, and are broadcast via optical path 122 in downstream direction 110 to all optical network terminals (ONTs) via optical distribution network (ODN) 107. The ODN 107 provides downstream optical path 122 and upstream paths 112 and 116 between OLT and ONTs, such as ONT 108 and ONT 109, respectively. Upstream signals originating at the ONTs travel in the direction of arrows 113 and 117, which are combined using TDMA techniques at OLT 104. OLT 104 is responsible for assigning upstream time slot assignments to ONT 108 and 109 to permit orderly transmission of upstream optical signals containing data frames 114, 115, 118 and 119. Standard transmission range 106 of the passive optical network 120 is typically on the order of twenty kilometers.

TDMA PON is standardized according to one of two protocols, namely, the EPON (Ethernet Passive Optical Network) family developed at IEEE and the GPON (Gigabit Passive Optical Network) developed at ITU-T. The EPON family includes Gigabit EPON and 10 Gigabit EPON. The GPON PON family includes 2.5G/1.25G GPON and 10G/2.5G XGPON1, and recently the NG PON2 standard been developing at ITU-T.

At an ONT, the optical signals are converted to electrical signals, the TDMA PON overheads are removed, and the customer data which is normally in Ethernet format are transmitted as electrical signals to a customer's home network to be distributed to the consumer devices in the home. An example of a prior art optical conversion protocol is disclosed in U.S. Pat. No. 8,559,459, entitled DYNAMIC BANDWIDTH ALLOCATING CONTROL APPARATUS WITH BANDWIDTH USABILITY IMPROVED, issued to Sarashina et al. While Dynamic Bandwidth Allocation is a protocol used for communication between the OLT and ONT, it is not directly related to the teachings of the present disclosure.

The main physical media for home networking today may include a twisted pair phone line, power lines and coaxial cables. Although these are different media, they share the same limitations, namely limited available spectrum, limited bandwidth, vulnerability to RF interference, vulnerability to EMI, lower physical layer (PHY) and media access control layer (MAC) efficiencies as well as relatively high complexity at the PHY and MAC layers.

Advancement of FTTH technology has enabled gigabit rate services to be delivered to the home. The existing home network physical media are the slowest data transfer points in the network. Copper based home networking media and standards have inherent limitations on bandwidth and low PHY efficiency. The capacity of Wi-Fi home networking is limited by the available RF spectrum and by regulatory constraints.

Plastic Optical Fiber (POF) has the potential as a new physical medium to overcome the limitation of copper for home networking. An example of a prior attempt to introduce a fiber optic network into the home is disclosed in U.S. Pat. No. 5,760,941, entitled SYSTEM AND METHOD FOR PERFORMING OPTICAL CODE DIVISION MULTIPLE ACCESS COMMUNICATION USING BIPOLAR CODES, issued to Young et al. The Young, et al. disclosure does not contemplate the use of Plastic Optical Fiber. There are heretofore unaddressed needs with previous optical networking solutions.

SUMMARY

Embodiments of the present disclosure include a system that permits the use of time division multiple access (TDMA) passive optical networks (PON) with a plastic optical fiber (POF) in a home network environment. One method of implementing the system includes utilizing an optical network terminal (ONT) to convert a received optical signal into an electrical signal while simultaneously removing the TDMA PON overhead and restore Ethernet data frame and management frame format. A POF converter in the ONT modulates the Ethernet frames, which carries customer data and management data, creating an optical signal which is forwarded to the POF cables in the home network. The embodiments herein thereby provide a method for extending passive optical networking from a single mode fiber to a POF in the home network system.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
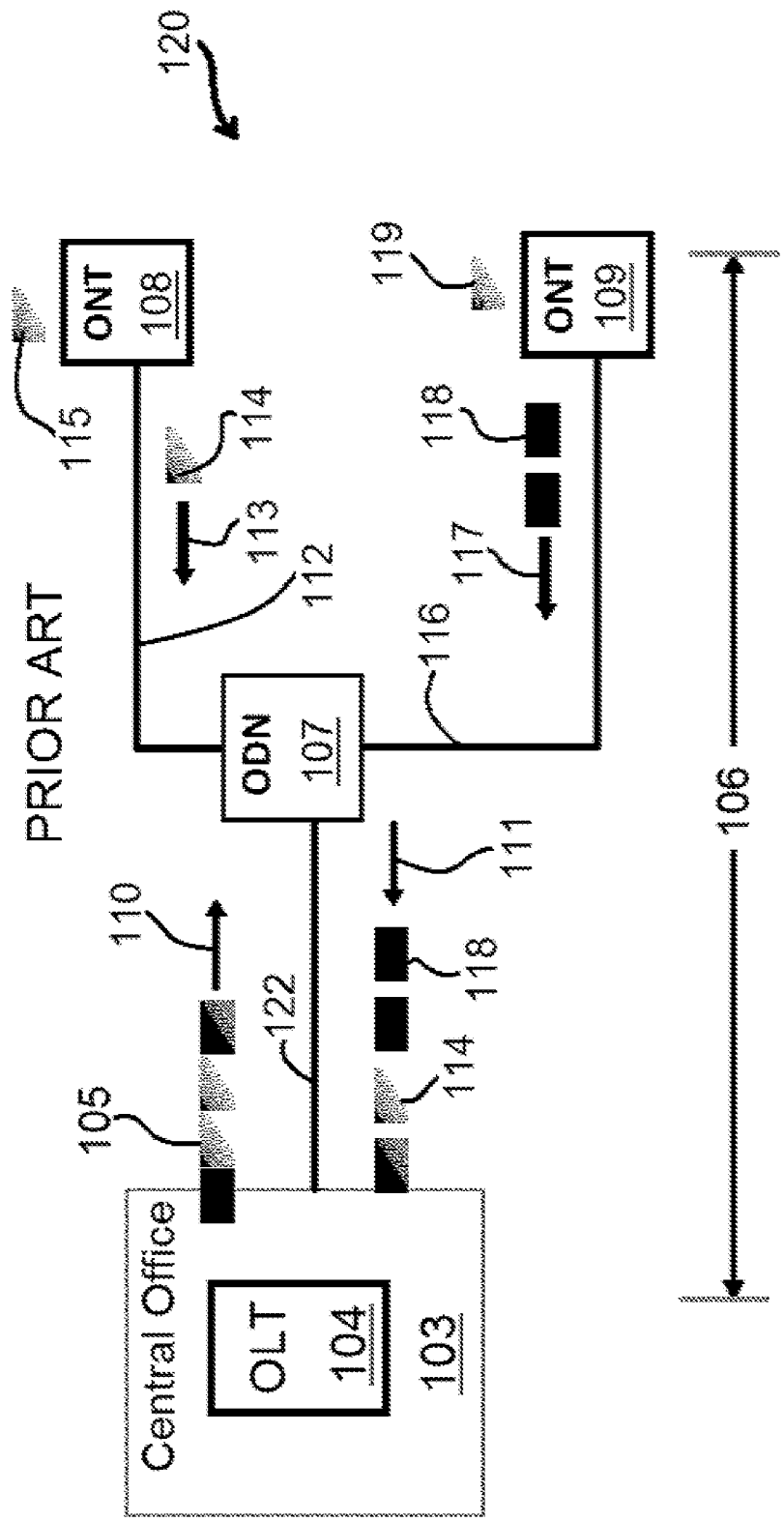
FIG. 1 is a schematic view of a prior art time division multiple access passive optical network.
Figure 2:
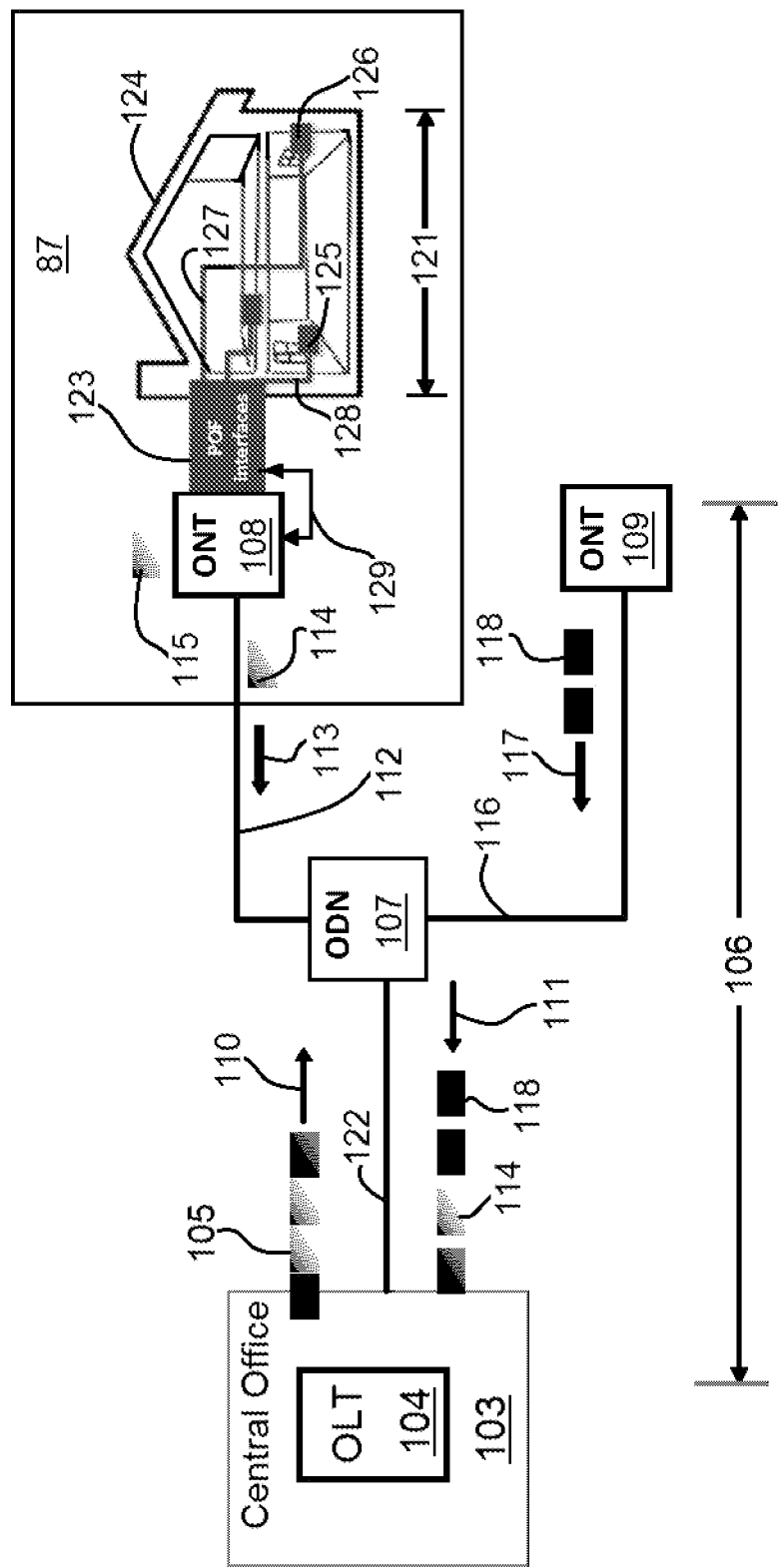
FIG. 2 is a schematic diagram of an example embodiment of a time division multiple access (TDMA) passive optical network (PON) with plastic optical fiber (POF) interfaces as utilized in a home networking context.
Figure 9:
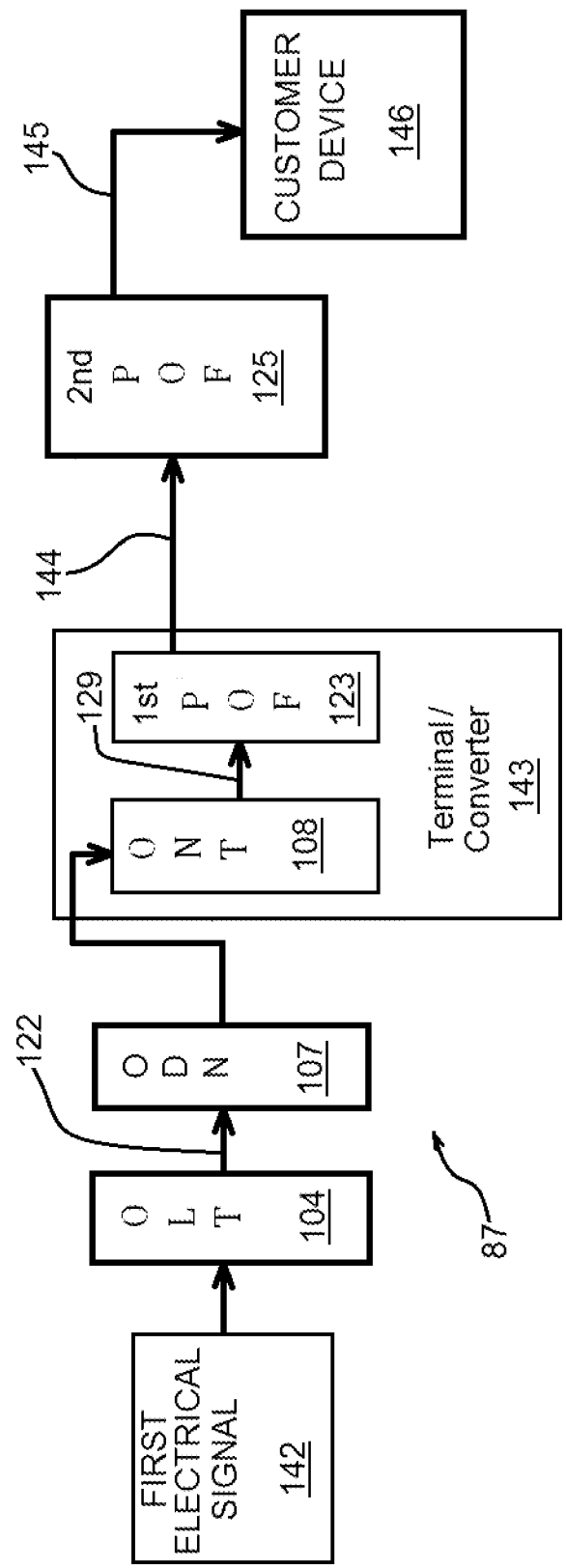
FIG. 9 is a block diagram illustrating an example embodiment of the downstream data/signal flow of a system of extending time division PON services to POF in the home.

As seen in FIGS. 2 and 9, an example embodiment of system 87 includes one or more plastic optical fiber interfaces 123 which are interconnected between the existing glass fiber optical network terminal (ONT) 108 and one or more plastic optical fiber cables 127 and 128, for example, which are routed throughout a home or other customer location 124. Initially, first electrical signal 142 generated at central office 103 is forwarded to optical line terminal 104. Optical line terminal 104 generates first optical signal 122 which is forwarded to optical distribution network 107, exiting ODN 107 as distributed optical signal 112 that is forwarded to terminal/converter assembly 143. ONT 108 within assembly 143 receives distributed optical signal 112 and generates second electrical signal 129. Second electrical signal 129 travels between ONT 108 and first POF interface/converter 123. First POF interface or converter 123 converts second electrical signal 129 into second optical signal 144 that may be transmitted by POF cable 127. Each plastic optical fiber cable may be connected to a second plastic optical fiber (POF) converter such as POF converter 125 or 126. Second POF converter 125 receives an optical signal from POF interface 123 and converts it into third electrical signal 145 that may be decoded by customer device 146. POF converter 125 may be located within customer device 146, such as a television or computer, or may be located within a wall jack or other convenient termination. Transmission range 121 of the plastic optical fiber network is typically between twenty and one hundred meters.

Figure 10:
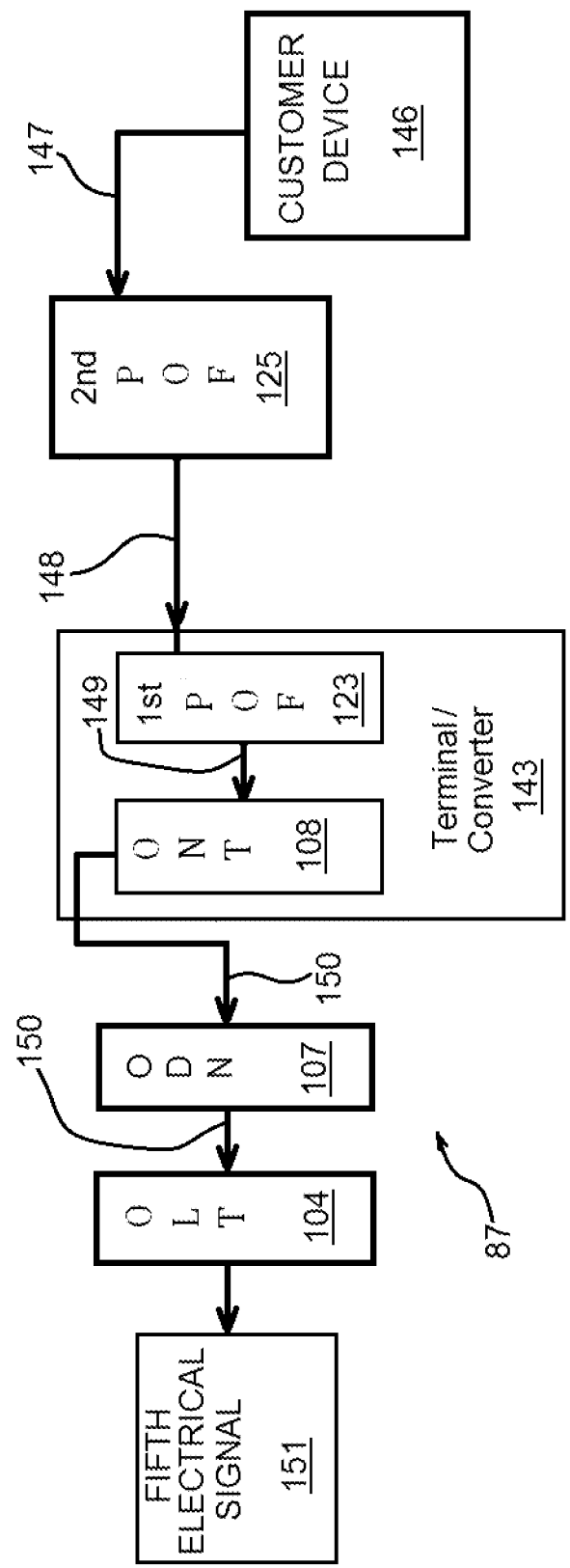
FIG. 10 is a block diagram illustrating an example embodiment of the upstream data/signal flow of a system of extending time division PON services to POF in the home.

Referring also to FIG. 10, in the upstream direction, electrical Ethernet signal 147 generated by customer device 146 may be converted into modulated third optical signal 148 by a second POF converter 125. Third optical signal 148 is transmitted via a separate upstream POF cable to first POF converter 123, which creates fourth electrical signal 149 that is forwarded to ONT 108. Modulated fourth optical signal 150 containing Ethernet frames with TDMA PON overheads are generated by the ONT 108. At the ONT 108 fourth electrical signal 149 is demodulated and converted into fourth optical Ethernet signal 150 to permit transmission upstream to OLT 104. Finally, OLT 104 converts fourth optical signal 150 into fifth electrical signal 151 which can be utilized by central server 103. The downstream wavelength for POF transmission is 650 nm. The upstream wavelength for POF transmission is also 650 nm but occurs on a separate POF cable.

Figure 3:
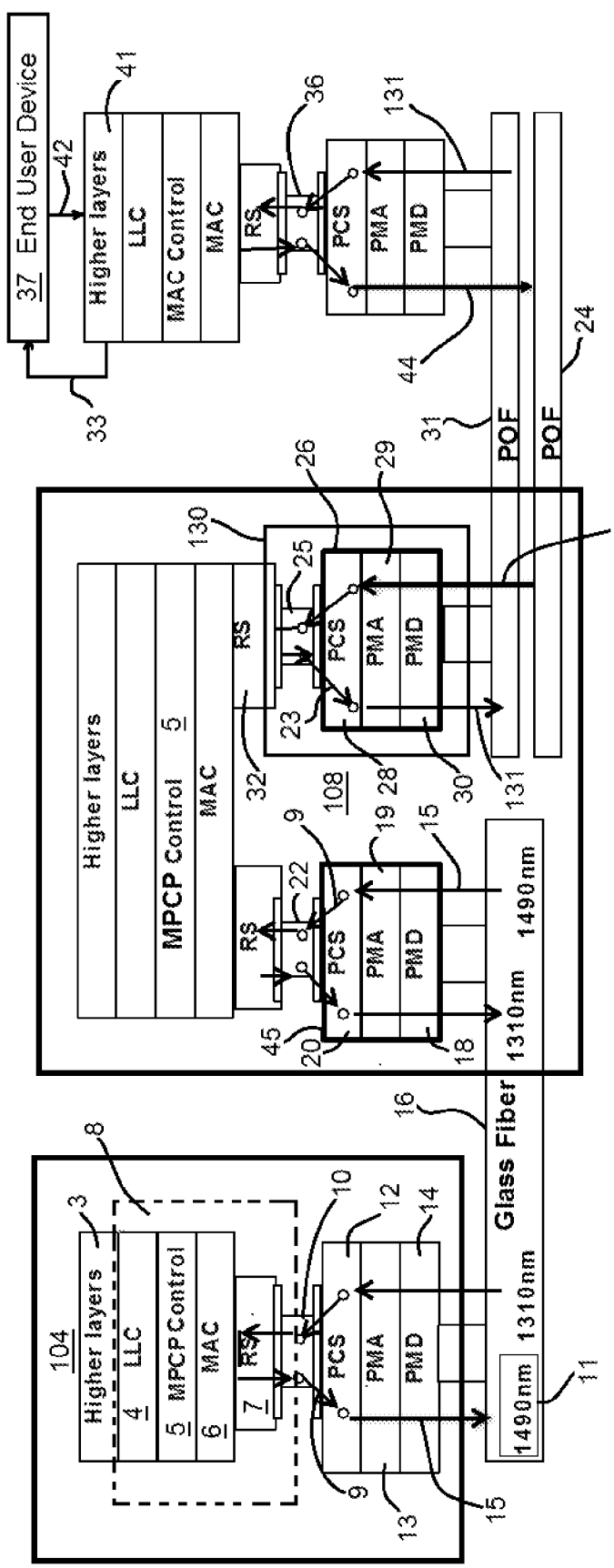
FIG. 3 is a schematic protocol diagram of an example embodiment of a TDMA Ethernet passive optical network (EPON) extended to a plastic optical fiber network as depicted in FIG. 2.

FIG. 3 depicts the protocol architecture of an example embodiment of the EPON, which permits the use of a TDMA EPON with the POF home network. OLT 104, which is located at the central office, includes various elements of an EPON protocol stack. Higher layer data 3 is encapsulated into EPON frame 8 that includes logical link control (LLC) 4, multiple point control protocol (MPCP) 5 for task scheduling, media access control (MAC) 6 and reconciliation sub-layer (RS) 7 layers. Bit streams 9 from RS 7 are transmitted via parallel stream media independent interface 10 (GMII for EPON, XGMII for 10G EPON) to lower physical layers (PHY) which include physical coding sub-layer 12 (PCS), physical media attachment layer 13 (PMA) and physical media dependent (PMD) layer 14. In this manner, in downstream optical signal 15, the data from higher layers 3 is encapsulated into EPON frames 8 and converted into an optical signal at EPON or 10G EPON PHY 11 to be transmitted into glass optical fiber 16 at a frequency corresponding to wavelength 11 of 1490 nm.

The PHY of ONT 108 is seen to include EPON protocol stack 45 having layers 18, 19 and 20. Protocol stack 45 receives optical signal 15 from optical line terminal 104. Received downstream optical signal 15 is converted into an electrical signal at PMD layer 18 and decoded at PMA layer 19 and PCS 20. The converted electrical signal containing bit stream 9 enters GMII (or XGMII) 22 which extracts the Ethernet frames from the bit stream. MPCP 5 terminates at ONT 108.

ONT 108 also contains POF converter 130. Transmission path 23 represents the outbound data stream exiting reconciliation sub-layers 32. At this point EPON frames 8 have had MPCP 5 and logical link identifier data 4 removed, leaving essentially Ethernet frames with encapsulated customer data and management data. The Ethernet frames are transmitted via XGMII (or GMII) interface 25 to POF lower layers 26 to create an optical signal to be transmitted to POF cable 31 at a wavelength of 650 nm. Lower layers 26 include PCS 28, the PMA layer 29 and the PMD layer 30.

Optical signal 131 received from POF cable 31 at the downstream POF receiver is demodulated and converted into an electrical signal and processed at PMA and PCS layers and sent to MAC and higher layer architecture 41 via path 36 through the media independent interface (XGMII or GMII) 36. Decoded Ethernet frames 33 that contain customer data are then sent to customer or other end user devices 37 by means of a suitable electronic transmission interface.

The inbound or upstream customer generated data enters along signal path 42 and follows the reverse process of the downstream or outbound server generated data as the customer generated data passes through higher layer architecture 41, MAC layer and GMII 36 to enter upstream plastic optical fiber 24. The customer data for higher layers 41 is encapsulated into Ethernet frames which are modulated into an optical signal at the PMD layer via GMII 36 where the frames are forwarded along signal path 44 for transmission to upstream POF cable 24.

Optical signal 34 received from upstream plastic optical fiber cable 24 is demodulated into electrical signals at PMD layer 30 and then processed at the PMA layer 29 and PCS 28. The extracted Ethernet frames are then sent to the MPCP layer 5 to be scheduled for transmission to OLT 104.

Figure 4:
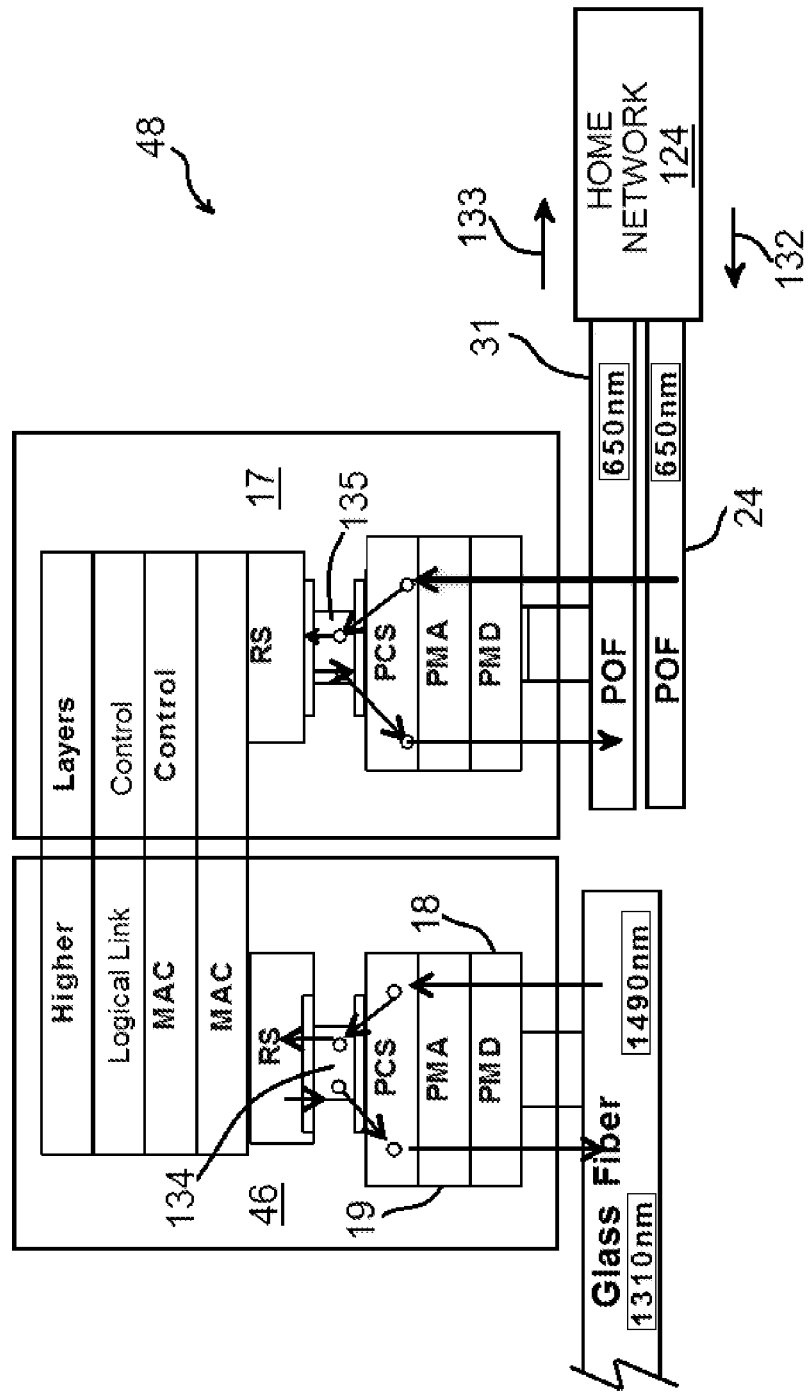
FIG. 4 is a schematic depiction of an example embodiment of the high level architecture of a TDMA Ethernet passive optical network (EPON) to POF converter as illustrated in FIG. 3.

As seen in FIG. 4, EPON POF converter 48 includes outbound interface 46 which interfaces with a PON ODN, such as ODN 107 as shown in FIG. 2. Outbound interface 46 includes GMII 134. The upstream direction is indicated by arrow 132. Inbound interface 17 of EPON POF converter 48 connects to POF cables 31 and 24 to deliver point to point Ethernet within a home network 124. Inbound interface 17 includes GMII 135. The downstream direction is indicated by arrow 133. The downstream and upstream data of Ethernet interface 17 connects to separate POF cables 31 and 24, respectively.

Figure 5:
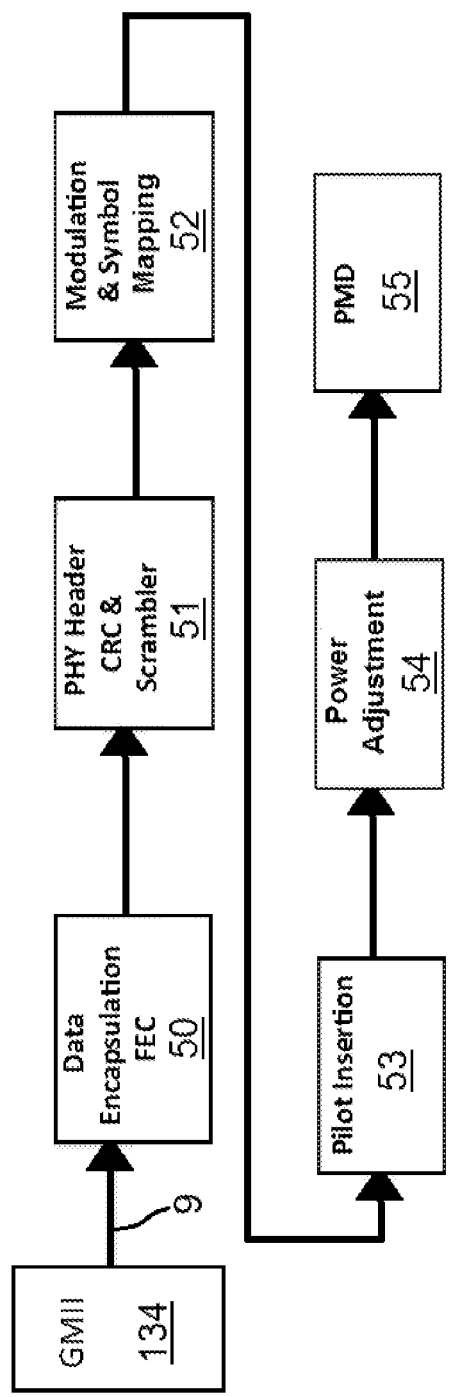
FIG. 5 is a block diagram of an example embodiment of the EPON to POF converter as illustrated in FIG. 4.

Referring also to FIG. 5, the processing of data or bit stream 9 passing through EPON POF converter 46 is seen to include at step 50 the reception of bit streams 9 from GMII interface 134 which are then encapsulated into a POF data frame and encoded with 64B/66B code. In the case of EPON and Ethernet frames, the original 8B/10B line code may be replaced with 64B/66B code; this reduces overhead by twenty five percent. The data frame is sent to an error processor which performs forward error correction (FEC) encoding. Step 50 performs the function of a scrambling processor by scrambling or randomizing the data frames. In the case of 10G EPON, there are no changes in line code because the 10G EPON protocol is already utilizing the 64B/66B line code.

At step 51, PHY overhead is added, a cyclic redundancy check (CRC) is performed and the frame data is randomized. The PHY overhead includes frame overhead, signaling overhead and other command overhead requirements.

Data and control frames are modulated and mapped into symbols at step 52. Several advanced modulation schemes may be used, including, for example, multilevel plus amplitude modulation (M-PAM), multilevel amplitude shift keying (M-ASK), quadrature phase shift keying (QPSK), quadrature amplitude shift keying (QASK) and orthogonal frequency division multiplexing (OFDM), as well as other modulation schemes that are compatible with light emitting diode modulation requirements.

M-PAM is often suitable as a low cost modulation solution with relatively high spectral efficiency (bit/s/Hz). M-PAM is a one-dimensional modulation code that is relatively less complex than two dimensional codes such as QAM and OFDM. M-PAM utilizes relatively low cost Intensity Modulation—Direct Detection (IM-DD) methods for data transmission and detection.

The bit error rate (BER) of M-PAM can be expressed as:

$$BER=[(M-1)/(M \log_2 M)]\mathrm{erfc}(\sqrt{[(3/2(M^2-1))S/N]}$$

where M is the modulation order, S/N is signal to noise ratio and erfc is the complementary error function. Assuming a BER=$10^{-6}$, the required S/N for 8-PAM is 26.56 dB.

The theoretical spectral efficiency of M-PAM is $2 \log_2(M)$. If the effect of forward error correction (FEC) is included, the true spectral efficiency of M-PAM be expressed as:

$$C_{PAM}=2 \log_2(M)*R$$

where R is the FEC code rate. Assuming an 8-PAM with a FEC code rate of 0.90 for example, the true spectral efficiency is:

$$C_{PAM}=2 \log_2(8)*0.90=5.40 \text{ bit/s/Hz}$$

The Shannon limit defines the signal to noise ratio for acceptable data reception and is expressed as:

$$S_{hannon}=\log_2(1+S/N) \text{bit/s/Hz}.$$

The lower boundary of an acceptable S/N ratio according to the Shannon limit equation can be expressed as $$10 \log_{10}(2^C-1).$$

Assuming the spectrum efficiency is 5.40 bit/s/Hz, the Shannon limit equation defines 16.2 dB as the lowest usable S/N ratio.

At step 53 of the data processing scheme, pilot tones are inserted for channel estimation and monitoring purposes. Transmission power is adjusted at step 54 within PMA layer processor 19, with the data being converted to an optical signal at step 55 within PMD layer 18.

Figure 6:
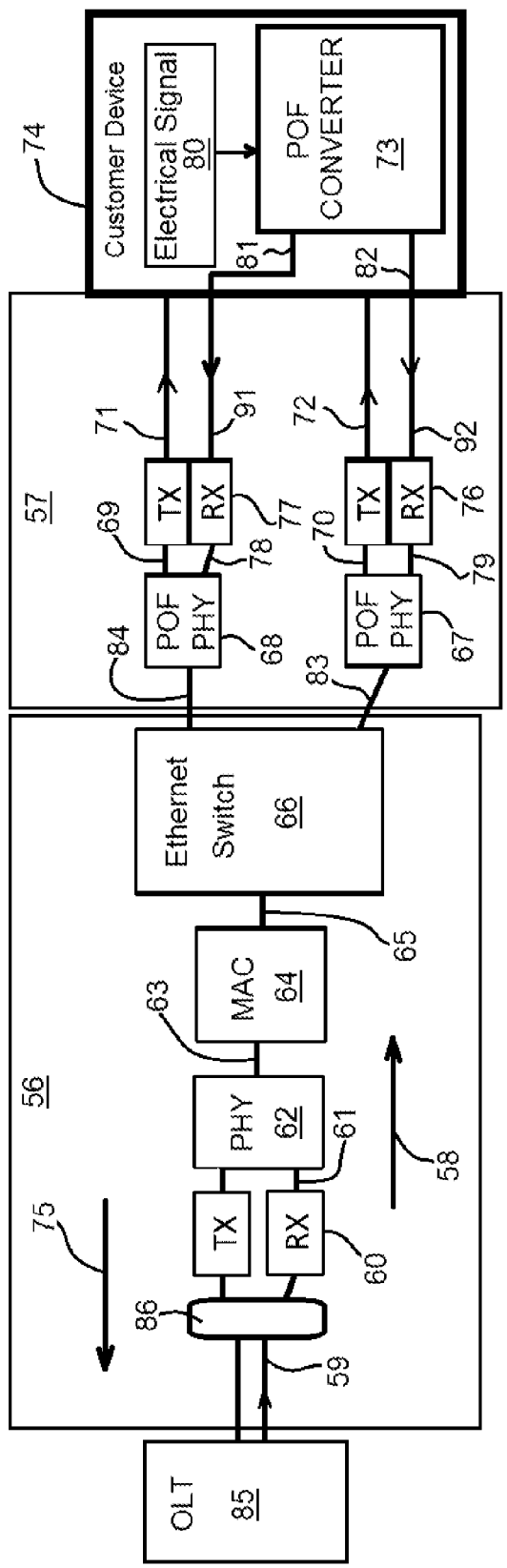
FIG. 6 is a block diagram of an example embodiment of a TDMA PON ONT with POF interfaces.

Referring also to FIG. 6, an implementation of TDMA PON ONT 56 with POF converter 57 is depicted. In downstream direction 58, optical signal 59 with wavelength lambda$_{DS}$ is sent via glass single mode fiber cable to ONT receiver 60. Converted electrical signal 61 is sent to TDMA PON PHY 62 for decoding. Decoded signal 63 is sent to MAC microprocessor 64 for further signal processing. Ethernet frames 65 from MAC microprocessor 64 are sent to Ethernet switch 66, which forwards Ethernet frames 65 to proper POF PHY 67, 68 for the application of modulated signal 69, 70 to downstream POF cable 71, 72 to send to POF converter 73 in the home network for connecting to customer devices 74.

In upstream direction 75, POF receiver 76, 77 and POF PHY 67, 68 decode modulated optical signal 81, 82 originating at POF converter 73 that converts electrical Ethernet signal 80 from customer devices into optical signals 81, 82. Ethernet frames 83, 84 that contain customer data are sent to Ethernet switch 66 and then forwarded to TDMA PON ONT MAC processor 64 and PHY processor 62 for transmitting to the TDMA PON OLT at wavelength lambda$_{US}$.

TDMA PON can operate according to various standards including the EPON protocol, 2.5/1.25 gigabit passive optical network (GPON) protocol, the ten gigabit Ethernet passive optical network (10G EPON) protocol and the 10G/2.5 gigabit passive optical network (XGPON1) protocol.

The lambda$_{US}$ signal frequency corresponds to a wavelength of 1310 nm for the EPON, 10G EPON and GPON protocols. The XGPON1 protocol operates at a signal wavelength of 1270 nm. The lambda$_{DS}$ wavelength is 1490 nm for the EPON and GPON protocols. The downstream signal frequency corresponds to a wavelength of 1578 nm for the 10G EPON and XGPON1 protocols.

Figure 7:
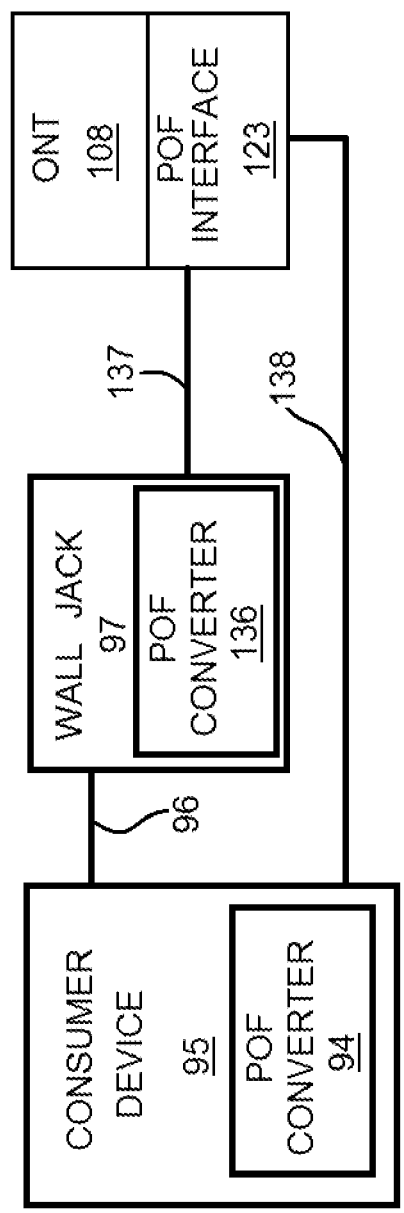
FIG. 7 is a schematic diagram of an example embodiment of a POF converter implementation in a home network environment.

FIG. 7 depicts a system implementation of an example embodiment of POF converter 94, 136 as may be used in a home network environment. POF converter 136 may be powered with external AC or DC power. In the case of POF 136, consumer device 95 such as an IP television receiver or a computer, for example, sends an Ethernet electrical signal along path 96 to separate wall jack 97, for example, that contains POF converter 136. Converter 136 may be powered either by an alternating current source or a direct current source associated with wall jack 97, or alternatively receives power over the Power over Ethernet (POE) derived from consumer device 95. Signal path 96 is typically contained within category 5 cables which provide Ethernet interconnections including both data and power. Wall jack 97 may be adapted to include at least one receptacle for category 5 cables as well as a receptacle for POF cable 137. Alternatively, POF converter 94 may be integrated or embedded within consumer device 95. In those situations, if POE is used, POF wall jack 97, if present, may include only passive optical connections and may not include or require a power source. Alternately, wall jack 97 may be omitted and POF cable 138 may be attached directly to a POF receptacle formed as part of consumer device 95.

Figure 8:
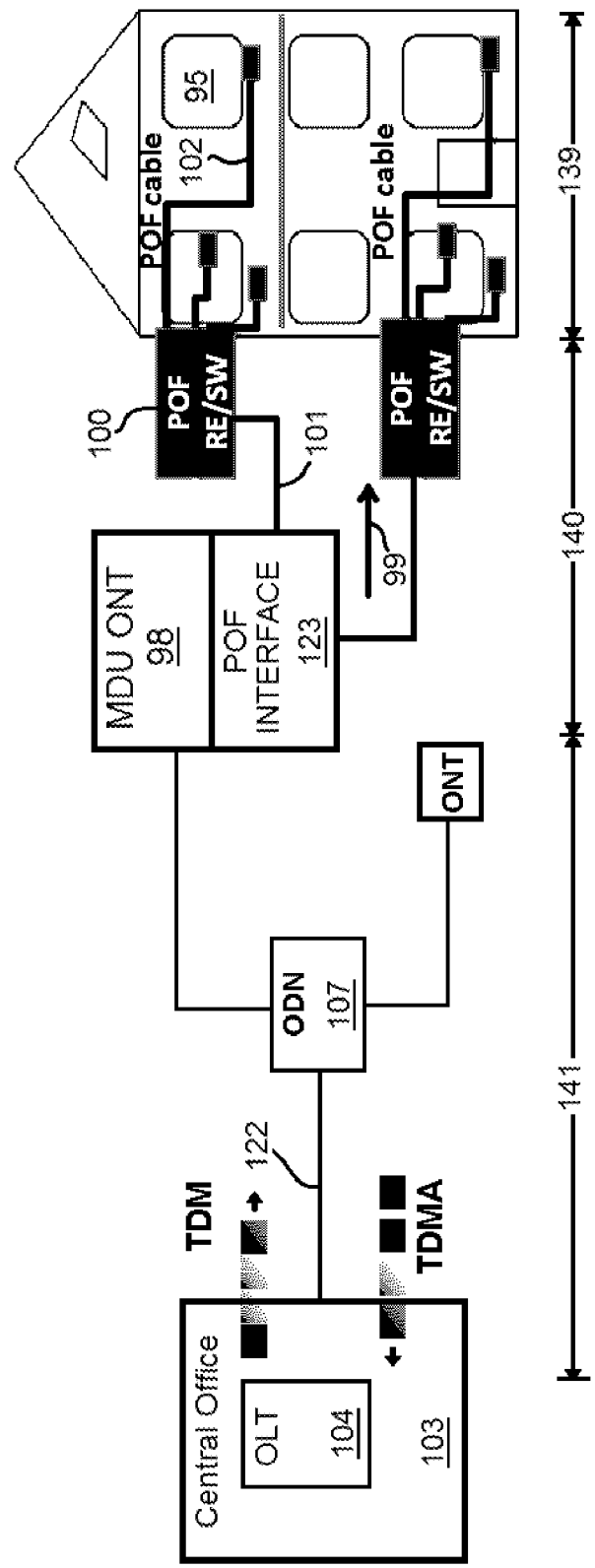
FIG. 8 is a schematic diagram of an example embodiment of a TDMA PON multiple dwelling unit (MDU) ONT with POF interfaces.

Referring also to FIG. 8, the present disclosure may be extended to multiple dwelling units or multiple homes by the addition of MDU ONT 98. Downstream Ethernet data 99 from MDU ONT 98 may be modulated into an optical signal having a wavelength of 650 nm and may be sent in the case of greater distances via point to point (P2P) grade index (GI-POF) cable 101 to POF repeater or switch 100. POF repeater/switch 100 performs optical-to-electrical-to-optical (OEO) conversion. The downstream optical signal from POF repeater/switch 101 is sent to in-home POF cable 102 for use within the home network. Fiber to the building distance 141 is approximately twenty kilometers, while the fiber in the home distance is approximately twenty to one hundred meters. MDU network distance 140 is approximately two hundred meters.

Figure 11:
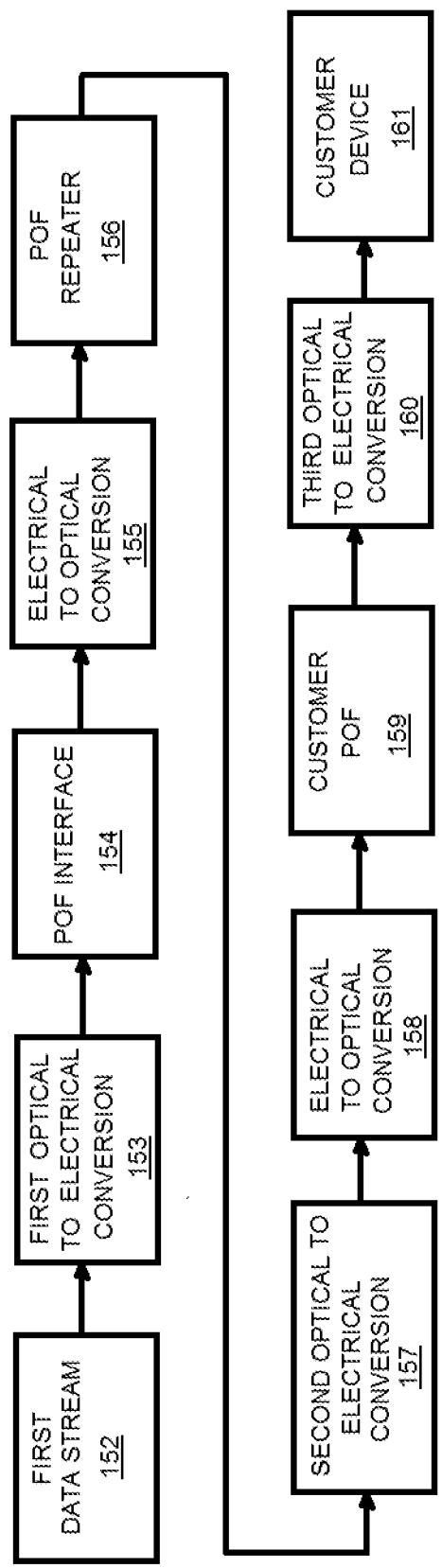
FIG. 11 is a flow chart illustrating an example embodiment of a method of processing data/signal flow from an optical line terminal (OLT) to a customer location.

The flow chart of FIG. 11 shows the architecture, functionality, and operation of a possible implementation of TDMA PON POF software. Block 152 depicts a first optical data stream received at an ONT from a data source such as, for example, a glass optical fiber OLT. The OLT converts the first optical data stream into a first electrical signal at step 153; the first electrical signal is then forwarded to a POF interface at step 154. The POF interface converts the first electrical signal into a second optical signal at step 155. Note that each step may represent a module, segment, or portion of code, which comprises one or more executable instructions for implementing the specified logical function(s). At step 156 a POF repeater then receives the second optical signal, converting the second optical signal into a second electrical signal at step 157. The POF repeater then converts the second electrical signal into a third optical signal at step 158. In some alternative implementations, the functions noted at each of these blocks may occur out of the order noted in the drawing. For example, depending on the direction of signal flow or the need for additional signal amplification, two blocks shown in succession in FIG. 11 may in fact be executed substantially concurrently or the steps may sometimes be executed in the reverse order, depending upon the functionality involved. Typically, at step 159 the third optical signal is forwarded to a POF located at a customer location. The third optical signal is then converted into a third electrical signal at step 160 for further processing by a particular customer device at step 161.

Any of the foregoing process descriptions or blocks should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiments, including the server, can be implemented in hardware, software, firmware, or a combination thereof. In example embodiments, the logic is implemented in software or firmware that is stored in a memory and that is executed by a suitable instruction execution system. The server includes one or more processing units that are operable to execute computer software instructions and to manipulate data according to the computer software instructions. A processor unit can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums. The server further includes, or is communicatively connected to, volatile and non-volatile memory for storing computer software instructions to be executed by the processing unit(s) and for storing and recalling data related to the tags/modules.

Additionally, the server comprises an operating system that controls and manages operation of the server and that includes computer software instructions executed by the server's processing unit(s). The server further comprises a plurality of computer software and data components that cooperatively cause the server to provide TDMA PON POF functions. The operating system and computer software and data components, according to example embodiments are stored on or by the server's volatile and/or non-volatile memory. In other embodiments, the computer software and data components, or portions thereof, may be stored on or by device(s) that are not part of the server. The computer software and data components include an TDMA PON POF software component having a plurality of computer software instructions that when executed by a processing unit(s) of the server, causes the server to perform according to an TDMA PON POF method described hereinabove.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations can be made thereto without departing from the spirit and scope of the disclosure as defined by the appended claims.

I claim:
1. A system, comprising:
 a first optical line terminal, the first optical line terminal converting a received first electrical signal into a first optical signal;

a first optical network terminal, the optical network terminal interconnected to the first optical line terminal, the optical network terminal receiving the first optical signal and converting the first optical signal into a second electrical signal;

a first plastic optical fiber converter, the first plastic optical fiber converter interconnected to the first optical network terminal, the first plastic optical fiber converter modulating the second electrical signal to create a second optical signal, the second optical signal available for further processing;

a second plastic optical fiber converter, the second plastic optical fiber converter being interconnected to the first plastic optical fiber converter, the second plastic optical fiber converter receiving the second optical signal from the first plastic optical fiber converter, the second plastic optical fiber converter comprising a plurality of first signal processing layers, the first signal processing layers being adapted to:

receive the second optical signal;

demodulate the second optical signal; and convert the second optical signal into a third electrical signal, the third electrical signal containing data usable by an end user device; and an electrical transmission interface, the electrical transmission interface forwarding the third electrical signal to the end user device, wherein the first plastic optical fiber converter further comprises:

a plurality of second signal processing layers, the second signal processing layers being adapted to:

receive a third optical signal from a second plastic optical fiber, the second plastic optical cable being interconnected to the second plastic optical fiber converter, and the end user device;

convert the third optical signal into a fourth electrical signal;

demodulate the fourth electrical signal, thereby creating a demodulated fourth electrical signal; and convert the demodulated fourth electrical signal into a fourth optical signal at the optical network terminal; and an optical transmission interface at the optical network terminal, the optical transmission interface permitting the fourth optical signal to be forwarded to the optical line terminal.

2. The system of claim 1, wherein demodulation of the fourth optical signal at the first optical line terminal extracts Ethernet frames which contain data transmitted by end users.

3. The system of claim 1, wherein the passive optical network is a time division multiple access passive optical network comprising:

the optical line terminal, wherein the optical line terminal is associated with a central server and adapted to transmit data to and receive data from an end user location;

at least one second optical network terminal, each optical network terminal being located at an end user location;

data transmission and reception interfaces processing data utilizing at least one protocol selected from the group including (a) Ethernet Passive Optical Network; (b) Gigabit Passive Optical Network; (c) Ten Gigabit Ethernet Passive Optical Network; (d) 2.5G/1.25G Gigabit Passive Optical Network; and (e) 10G/2.5G XGPON1.

4. The system of claim 3, further comprising:

an optical distribution network, the optical distribution network receiving data from the optical line terminal at the central office;

a media independent interface, the media independent interface being interconnected with first optical network terminal via the optical distribution network, the media independent interface including the plurality of first signal processing layers, comprising:

a physical coding layer, the physical coding layer utilizing 64B/66B line-code;

a physical media attachment layer; and a physical media dependent layer, the Ethernet frames being extracted from a data stream by the media independent interface.

5. The system of claim 4, wherein the physical coding layer comprises:

an error processor, the error processor applying a forward error correction algorithm to the line code; and a scrambling processor, the scrambling processor repositioning elements of the line code to limit reception of the data to a receiver having a compatible descrambler.

6. The system of claim 5, wherein the physical coding layer further comprises a modulation processor, the modulation processor modulating and mapping the data frames into symbols, the modulation protocol being selected from a group including (a) Multi-level plus amplitude modulation, (b) Multi amplitude shift keying, (c) quadrature phase shift keying, (d) quadrature amplitude shift keying and (e) orthogonal frequency division multiplexing.

7. The system of claim 4, wherein the physical media attachment layer comprises a power processor, the power processor adjusting transmission power to a desired level to be forwarded to the physical media dependent layer.

8. The system of claim 4, wherein the physical media dependent layer comprises an electrical to optical converter, the electrical to optical converter receiving an electrical signal form the physical media attachment layer and creating an optical signal to be forwarded to the first plastic optical fiber.

9. An apparatus, comprising:

an optical network terminal (ONT), the optical network terminal converting a received optical signal from an optical line terminal into an electrical signal;

a network terminal physical layer processor, the network terminal physical layer processor interconnected to an optical receiver and a media access control processor, wherein the network terminal physical layer processor receives the electrical signal from the optical receiver that is interconnected with a glass optical fiber, the media access control processor interconnected to the network terminal physical layer processor for receiving a first processed electrical signal from the network terminal physical layer processor;

an Ethernet switch interconnected to the media access control processor for receiving a second processed electrical signal including Ethernet frames from the media access control processor;

a plastic optical fiber physical layer processor interconnected to the Ethernet switch and selectable by the Ethernet switch, the plastic optical fiber physical layer processor associated with an optical transmitter and configured for converting the second processed electrical signal into a modulated optical signal which is forwarded to a plastic optical fiber; and a second plastic optical fiber converter configured for converting the modulated optical signal into a final electrical signal that is usable by a desired end user device.

10. The apparatus of claim 9, wherein the network terminal physical layer processor decodes data frames contained within the electrical signal created by the ONT, the network terminal physical layer processor creating the first processed electrical signal which contains decoded frame data, the network terminal physical layer processor forwarding the first processed electrical signal to the media access control processor.

11. The apparatus of claim 9, further comprising:
a first plastic optical fiber receiver configured for receiving an upstream optical signal from the second plastic optical fiber converter, the second plastic optical fiber converter creating an upstream optical signal from an outgoing electrical signal generated by the desired end user device; and
a plastic optical fiber physical layer processor interconnected to the plastic optical fiber receiver, the plastic optical fiber physical layer processor decoding the upstream optical signal, thereby creating decoded data frames, the decoded frames being forwarded to the Ethernet switch which are forwarded to the media access control processor in the optical network terminal.

12. A method, comprising:
receiving a first data stream from a glass optical fiber optical line terminal at a multiple dwelling unit optical network terminal;
converting the first data stream from a first optical signal into a first electrical signal within the glass optical fiber optical network terminal;
forwarding the first electrical signal to a plastic optical fiber interface;
converting the first electrical signal into a second optical signal within the plastic optical fiber interface;
forwarding the second optical signal via a grade index plastic optical fiber to a plastic optical fiber repeater;
converting the second optical signal into a second electrical signal within the plastic optical fiber repeater;
converting the second electrical signal into a third optical signal within the plastic optical fiber repeater;
forwarding the third optical signal to a first customer plastic optical fiber located within the customer location;
receiving the third optical signal from a plastic optical fiber interconnected to a device within the customer location;
converting the third optical signal from the plastic optical fiber into a third electrical signal, the third electrical signal being usable by the customer device to present content of the data stream to a user of the customer device;
encoding a data stream with Ethernet frames at a customer device to generate an Ethernet data stream;
supplying electrical energy to a plastic optical fiber converter within a plastic optical fiber receptacle lack via power over Ethernet from the customer device via CAT5 or CAT6 Ethernet cable; and
forwarding Ethernet frames from the customer device to a plastic optical fiber receptacle jack via CAT5 or CAT6 Ethernet cable.

13. The method of claim 12, further comprising:
converting the Ethernet data stream into an optical signal within the a plastic optical fiber converter integrated with the customer device, the optical signal being transmitted via a plastic optical fiber to a plastic optical fiber interface at an optical network terminal.

14. The method of claim 13, further comprising transmitting a plurality of customer device optical signals generated by a plurality of customer devices to the plastic optical fiber interface.

15. The method of claim 14, further comprising:
converting the plurality of customer device optical signals into electrical signals within the plastic optical fiber interface; and
forwarding each of the electrical signals to an optical network terminal; and
converting each of the electrical signals into additional optical signals at the optical network terminal.

16. The method of claim 15, further comprising:
time division multiplexing received data streams into a plurality of optical signals of same wavelength; and
transmitting each optical signal via an optical distribution network to an optical fiber optical line terminal.

* * * * *